US010644547B2

(12) United States Patent
Hino et al.

(10) Patent No.: US 10,644,547 B2
(45) Date of Patent: May 5, 2020

(54) ARMATURE

(71) Applicant: Mitsubishi Electric Corporation, Tokyo (JP)

(72) Inventors: Tatsuro Hino, Tokyo (JP); Akihito Mori, Tokyo (JP); Yutaka Hirota, Tokyo (JP); Masashi Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 234 days.

(21) Appl. No.: 15/938,028

(22) Filed: Mar. 28, 2018

(65) Prior Publication Data

US 2019/0131829 A1 May 2, 2019

(30) Foreign Application Priority Data

Nov. 1, 2017 (JP) .................. 2017-211609

(51) Int. Cl.
*H02K 1/14* (2006.01)
*H02K 1/18* (2006.01)
(Continued)

(52) U.S. Cl.
CPC ............... *H02K 1/16* (2013.01); *H02K 1/148* (2013.01); *H02K 1/18* (2013.01); *H02K 3/48* (2013.01);
(Continued)

(58) Field of Classification Search
CPC ...... H02K 1/16; H02K 15/028; H02K 15/024; H02K 3/48; H02K 3/12; H02K 2213/03; H02K 1/148; H02K 1/18
(Continued)

(56) References Cited

U.S. PATENT DOCUMENTS

2012/0019096 A1* 1/2012 Taniguchi .............. H02K 1/165
310/216.069
2015/0130311 A1* 5/2015 Murakami ............. H02K 1/148
310/89

FOREIGN PATENT DOCUMENTS

JP 2005-057886 A 3/2005
JP 2007-295740 A 11/2007
(Continued)

OTHER PUBLICATIONS

Communication dated Aug. 21, 2018 from the Japanese Patent Office in counterpart application No. 2017-211609.

*Primary Examiner* — Thomas Truong
(74) *Attorney, Agent, or Firm* — Sughrue Mion, PLLC; Richard C. Turner

(57) ABSTRACT

An armature core is configured by arranging into an annular shape: at least one first core segment that includes: a first core back portion; a first tooth portion; and a mounting portion that is formed on an outer circumferential portion of the first core back portion; and a plurality of second core segments that include: a second core back portion; and a second tooth portion; the mounting portion includes projecting portions that project on two circumferential sides from the first core back portion; and the first core segments and the second core segments that are adjacent to each other are fixed in a state in which facing side surfaces between the first core back portions and the second core back portions contact each other, and inner circumferential surfaces of the projecting portions and outer circumferential surfaces of the second core back portions are in contact.

18 Claims, 13 Drawing Sheets

(51) Int. Cl.
  *H02K 1/16*   (2006.01)
  *H02K 15/02*  (2006.01)
  *H02K 3/48*   (2006.01)
  *H02K 3/12*   (2006.01)

(52) U.S. Cl.
  CPC ......... *H02K 15/024* (2013.01); *H02K 15/028* (2013.01); *H02K 3/12* (2013.01); *H02K 2213/03* (2013.01)

(58) Field of Classification Search
  USPC .... 310/216.008, 216.009, 216.015, 216.016, 310/216.031, 216.058, 216.083, 216.084, 310/216.127, 216.128, 432
  See application file for complete search history.

(56) References Cited

FOREIGN PATENT DOCUMENTS

| | | |
|---|---|---|
| JP | 2009-11063 A | 1/2009 |
| JP | 2017-5873 A | 1/2017 |
| JP | 2017-192208 A | 10/2017 |

* cited by examiner

ARMATURE

BACKGROUND OF THE INVENTION

1. Field of the Invention

The present invention relates to an armature for a rotary electric machine such as an electric motor or a generator, for example, and particularly relates to an armature core construction that is configured by arranging core segments in a circumferential direction.

2. Description of the Related Art

In recent years, there has been demand for compactness, increased output, and quietness in rotary electric machines such as electric motors or generators. Armature cores that aim to increase efficiency by configuring an armature core using a laminated body of electromagnetic steel sheets to suppress the occurrence of eddy currents are widely known. Constructions that divide the armature core into a plurality of parts in a circumferential direction to improve coil space factor to improve output, and to improve productivity by facilitating mounting of coils to the armature core are also widely known.

Conventional armatures for rotary electric machines include: first stator segments that are constituted by a magnetic pole tooth and a yoke portion, that have a coupling portion on a side surface; and second stator segments that are constituted by a magnetic pole tooth, a yoke portion, and a fastening portion that is disposed on the yoke portion, that have a coupling portion on a side surface, the armatures being configured by arranging the first stator segments and the second stator segments into an annular shape so as to be linked at the coupling portions (see Patent Literature 1, for example).

In conventional armatures for rotary electric machines, the second stator segments have been disposed in fastening portions of the stator, and the first stator segments have been disposed in non-fastening portions. The fastening portions of the second stator segments of conventional armatures for rotary electric machines have been fastened and fixed to a fixing member such that the first stator segments and the second stator segments that are arranged in an annular shape are held by the fixing member. Thus, in conventional armatures for rotary electric machines, a cylindrical frame for fixing the first stator segments and the second stator segments that are arranged into an annular shape is no longer necessary, and the number of parts has been reduced.

CITATION LIST

Patent Literature

[Patent Literature 1] Japanese Patent Laid-Open No. 2005-57886 (Gazette)

SUMMARY OF THE INVENTION

However, in conventional armatures for rotary electric machines, the fastening portions have been formed on outer circumferences of the yoke portions of the second stator segments so as not to protrude in a circumferential direction from the yoke portions. Thus, the size of the fastening portions is limited, and if the diameter of bolt insertion apertures that are formed on the fastening portions is increased, the seat area of the fastening portions is reduced. Although the seat area of the fastening portions can be increased if the diameter of the bolt insertion apertures that are formed on the fastening portions are reduced, slender fastening bolts must be used, making fastening forces weak. As a result thereof, the armature could not be mounted to the fixing member firmly. Furthermore, in conventional armatures, the first stator segments and the second stator segments are in a state of contact with each other only at circumferential side surfaces, reducing the rigidity of the linked bodies between the first stator segments and the second stator segments.

From the above, one problem has been that in conventional rotary electric machines, noise is increased, making quietness poor.

The present invention aims to solve the above problems and an object of the present invention is to provide an armature that can reduce noise and improve quietness.

An armature according to the present invention includes: an annular armature core; and an armature winding that is mounted to the armature core, wherein: the armature core is configured by arranging into an annular shape: at least one first core segment that includes: a circular arc-shaped first core back portion; a first tooth portion that extends radially inward from an inner circumferential surface of the first core back portion; a mounting portion that is formed on an outer circumferential portion of the first core back portion; and a penetrating aperture that passes axially through the mounting portion; and a plurality of second core segments that include: a circular arc-shaped second core back portion; and a second tooth portion that extends radially inward from an inner circumferential surface of the second core back portion; the mounting portion includes projecting portions that project on two circumferential sides from the first core back portion; and the first core segments and the second core segments that are adjacent to each other are fixed in a state in which facing side surfaces between the first core back portions and the second core back portions contact each other, and inner circumferential surfaces of the projecting portions and outer circumferential surfaces of the second core back portions are in contact.

According to the present invention, because a mounting portion includes projecting portions that project on two circumferential sides from a first core back portion, holding strength of an armature core is increased. Because first core segments and second core segments that are adjacent to each other are fixed in a state in which facing side surfaces between the first core back portions and the second core back portions contact each other, and inner circumferential surfaces of the projecting portions and outer circumferential surfaces of the second core back portions are in contact, rigidity of the armature core is increased. An armature can thereby be obtained that can reduce noise, enabling quietness to be improved.

DETAILED DESCRIPTION OF THE PREFERRED EMBODIMENTS

Preferred embodiments of an armature for a rotary electric machine according to the present invention will now be explained with reference to the drawings.

Embodiment 1

Figure 1:
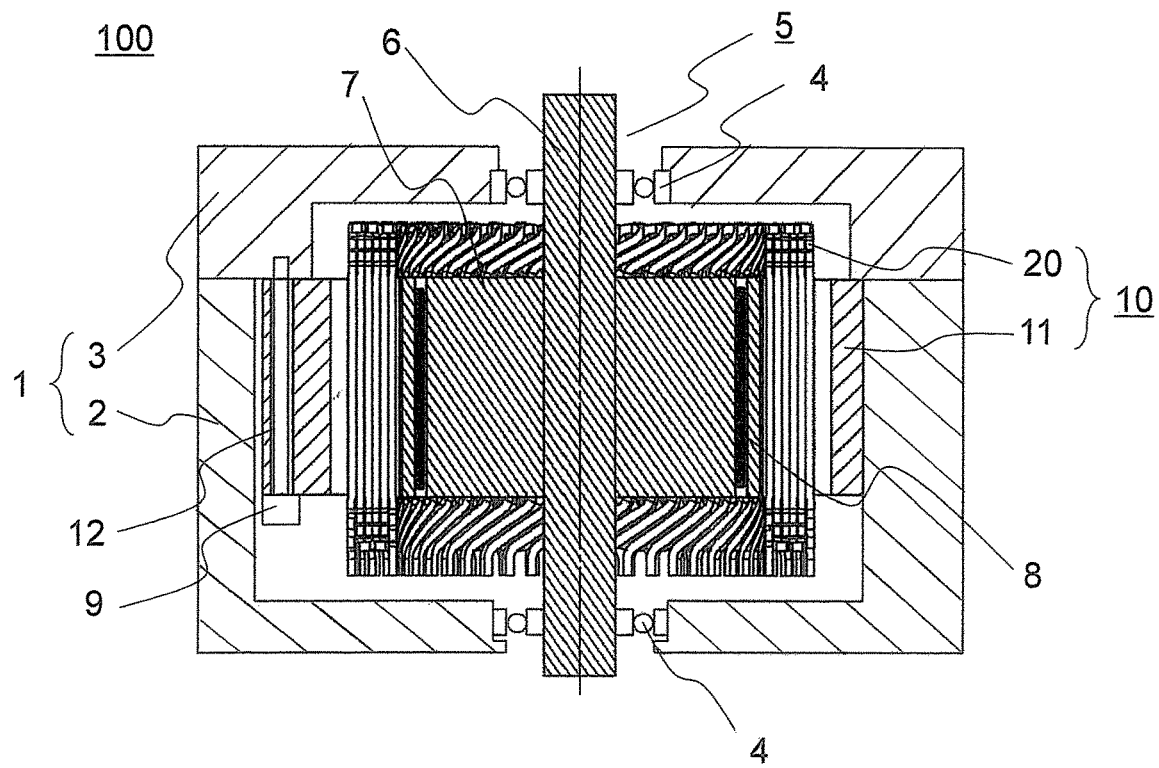
FIG. 1 is a cross section that shows a rotary electric machine according to Embodiment 1 of the present invention.
Figure 2:
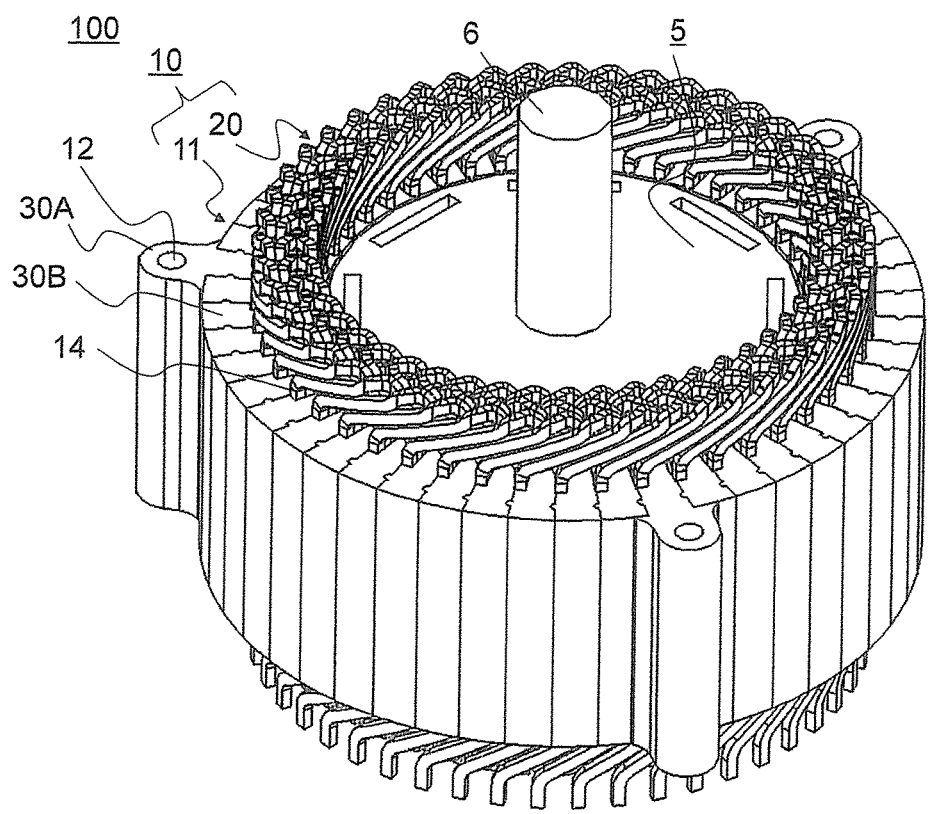
FIG. 2 is an oblique projection that shows part of the rotary electric machine according to Embodiment 1 of the present invention.
Figure 3:
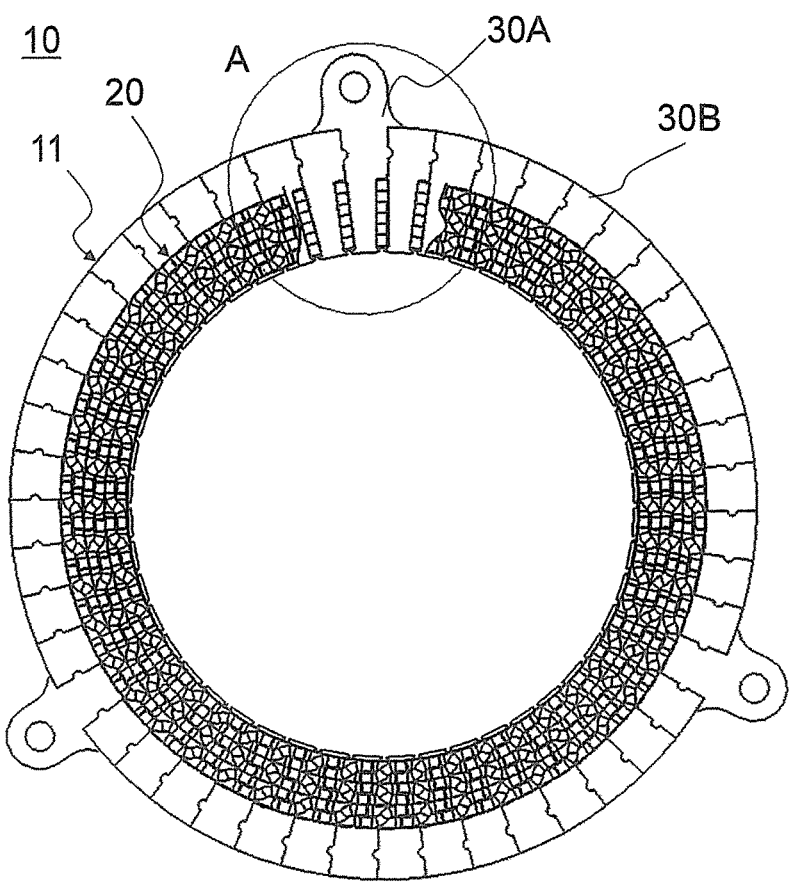
FIG. 3 is an end elevation that shows an armature according to Embodiment 1 of the present invention when viewed from axially outside.
Figure 4:
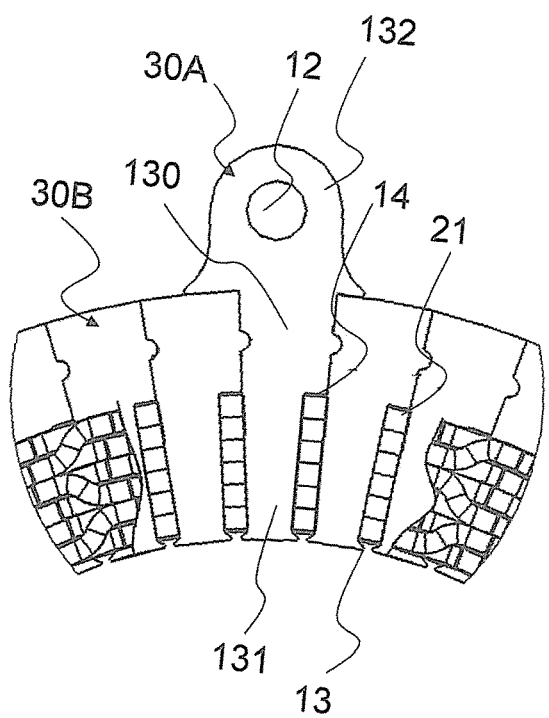
FIG. 4 is an enlarged portion of Portion A in FIG. 3.
Figure 5:
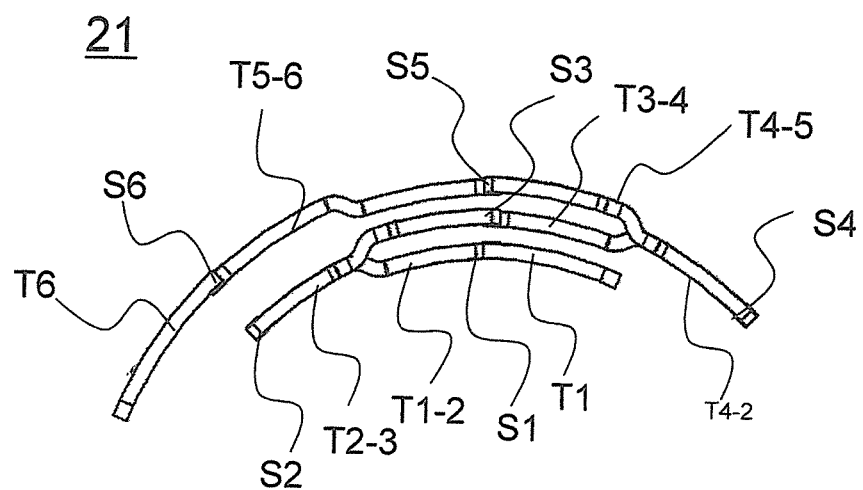
FIG. 5 is an end elevation that shows a unit coil that constitutes part of an armature winding in the armature according to Embodiment 1 of the present invention when viewed from axially outside.
Figure 6:
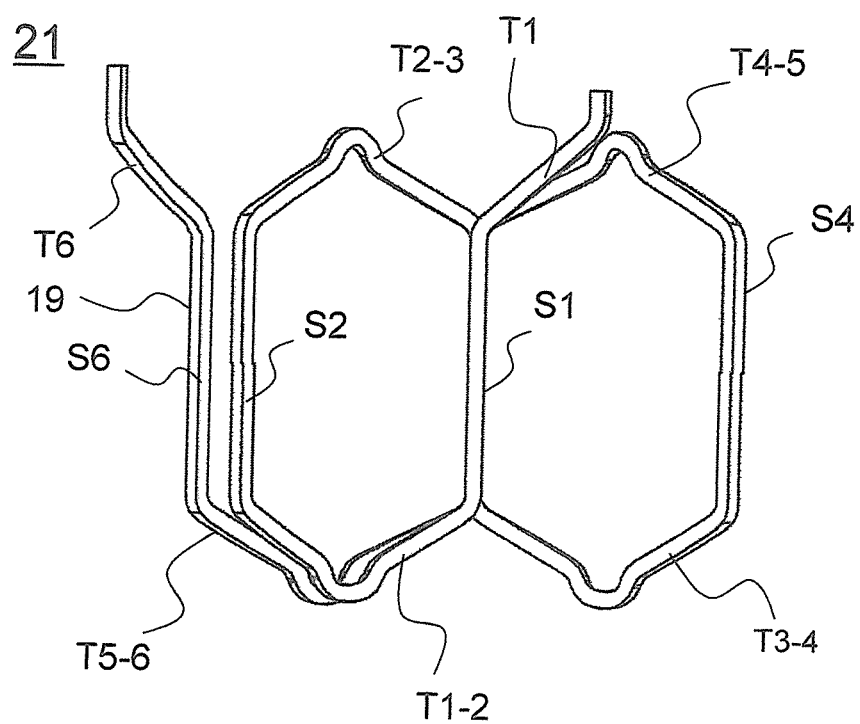
FIG. 6 is a front elevation that shows the unit coil that constitutes part of the armature winding in the armature according to Embodiment 1 of the present invention when viewed from radially inside.
Figure 7:
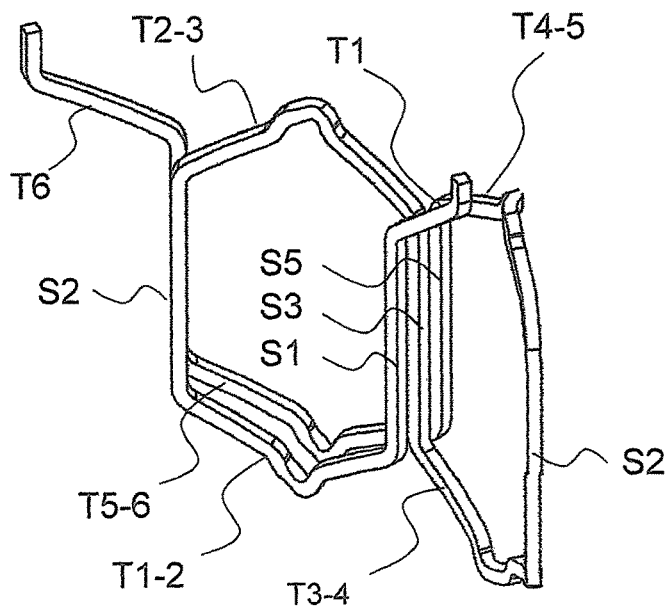
FIG. 7 is an oblique projection that shows the unit coil that constitutes part of the armature winding in the armature according to Embodiment 1 of the present invention.
Figure 8:
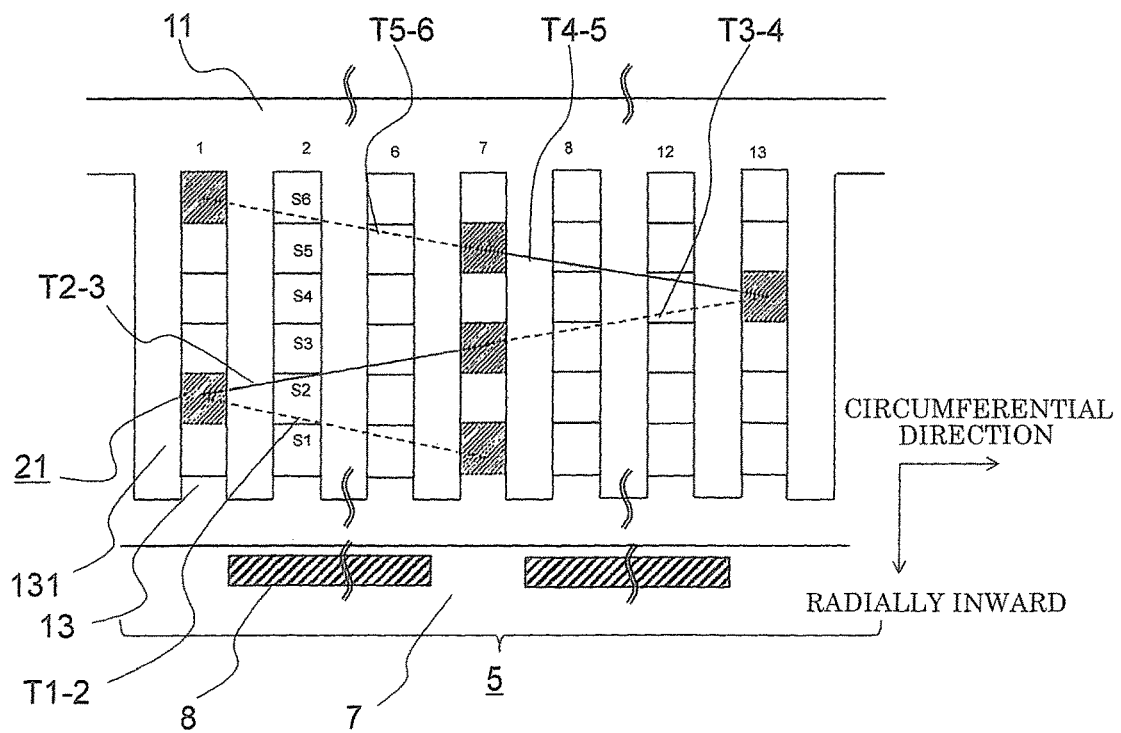
FIG. 8 is a partial cross section that schematically shows a slot-housed state of the unit coil in the armature according to Embodiment 1 of the present invention.
Figure 9:
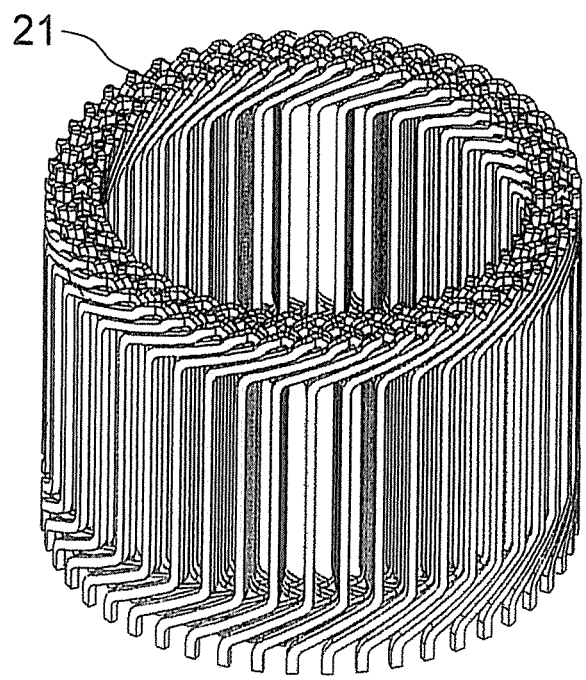
FIG. 9 is an oblique projection that shows the armature winding in the armature according to Embodiment 1 of the present invention.
Figure 10:
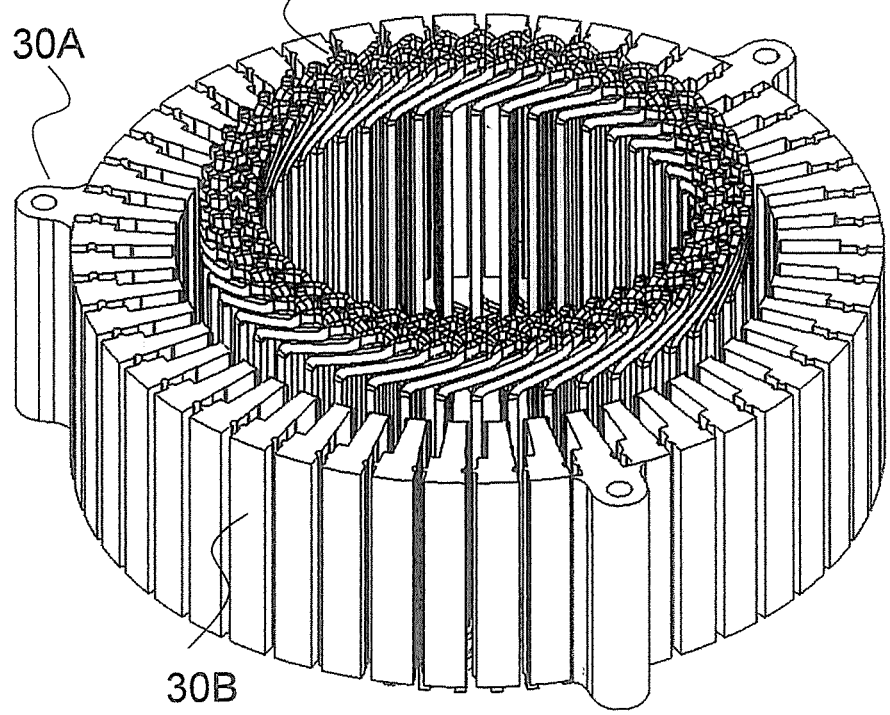
FIG. 10 is an oblique projection that explains a method for mounting the armature winding into an armature core in the armature according to Embodiment 1 of the present invention.
Figure 11:
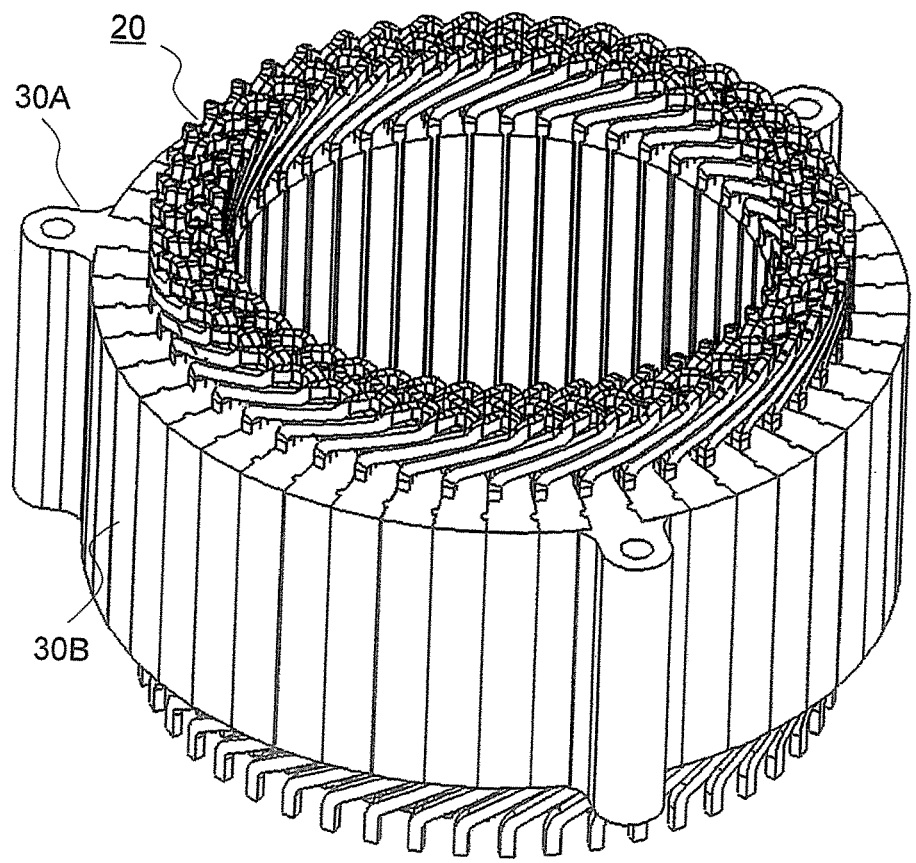
FIG. 11 is an oblique projection that shows a mounted state of the armature winding in the armature core in the armature according to Embodiment 1 of the present invention.

FIG. 1 is a cross section that shows a rotary electric machine according to Embodiment 1 of the present invention, FIG. 2 is an oblique projection that shows part of the rotary electric machine according to Embodiment 1 of the present invention, FIG. 3 is an end elevation that shows an armature according to Embodiment 1 of the present invention when viewed from axially outside, FIG. 4 is an enlarged portion of Portion A in FIG. 3, FIG. 5 is an end elevation that shows a unit coil that constitutes part of an armature winding in the armature according to Embodiment 1 of the present invention when viewed from axially outside, FIG. 6 is a front elevation that shows the unit coil that constitutes part of the armature winding in the armature according to Embodiment 1 of the present invention when viewed from radially inside, FIG. 7 is an oblique projection that shows the unit coil that constitutes part of the armature winding in the armature according to Embodiment 1 of the present invention, FIG. 8 is a partial cross section that schematically shows a slot-housed state of the unit coil in the armature according to Embodiment 1 of the present invention, FIG. 9 is an oblique projection that shows the armature winding in the armature according to Embodiment 1 of the present invention, FIG. 10 is an oblique projection that explains a method for mounting the armature winding into an armature core in the armature according to Embodiment 1 of the present invention, and FIG. 11 is an oblique projection that shows a mounted state of the armature winding in the armature core in the armature according to Embodiment 1 of the present invention. Moreover, in FIG. 8, only slot-inserted portions of the unit coil are depicted, and 1, 2, etc., through 12, and 13 are Slot Numbers that are allotted to the slots in circumferential order.

In FIG. 1, a rotary electric machine 100 includes: a housing 1 that has: a floored cylindrical frame 2; and a bracket 3 that closes an opening of the frame 2; an armature 10 that is fixed by being fastened to the bracket 3 by mounting bolts 9 that are inserted into bolt passage apertures 12, and that is housed inside a cylindrical portion of the frame 2; and a rotor 5 that is fixed to a rotating shaft 6 that is rotatably supported in the floor portion of the frame 2 and the bracket 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are that are housed inside magnet insertion apertures that pass through a vicinity of an outer circumferential surface of the rotor core 7 in an axial direction so as to be arranged at a uniform pitch in a circumferential direction to constitute magnetic poles. Moreover, the rotor 5 is not limited to a permanent-magnet rotor. A squirrel-cage rotor in which uninsulated rotor conductors are housed in slots of a rotor core such that two sides are shorted by a shorting ring, or a wound rotor in which insulated conductor wires are mounted into slots of a rotor core, etc., may be used as the rotor 5.

Next, configuration of the armature 10 will be explained in detail with reference to FIGS. 2 through 11. Moreover, to facilitate explanation, an axial direction of the rotating shaft 6 will be designated an axial direction, a radial direction of the rotating shaft 6 will be designated a radial direction, and a direction of rotation around a central axis of the rotating shaft 6 will be designated a circumferential direction.

As shown in FIGS. 2 and 3, the armature 10 includes: an armature core 11; and an armature winding 20 that is mounted to the armature core 11. Electrically insulating members 14 that electrically insulate between the armature winding 20 and the armature core 11 are mounted into slots 13 of the armature core 11.

Here, to facilitate explanation, the number of poles in the rotor 5 is eight, the number of slots in the armature core 11 is forty-eight, and the armature winding 20 is a three-phase winding. In other words, the slots 13 are formed on the armature core 11 at a ratio of two slots per phase per pole.

The armature core 11 includes: first core segments 30A that have: a circular arc-shaped core back portion 130 that constitutes a first core back portion; a tooth portion 131 that constitutes a first tooth portion that extends radially inward from an inner circumferential surface of the core back portion 130; and a mounting portion 132 that is formed integrally on an outer circumferential surface of the core back portion 130; and second core segments 30B that have: a circular arc-shaped core back portion 130 that constitutes a second core back portion; and a tooth portion 131 that constitutes a second tooth portion that extends radially inward from an inner circumferential surface of the core back portion 130. The armature 11 is configured by arranging forty-eight first core segments 30A and second core segments 30B into an annular shape by butting together circumferential side surfaces of the core back portions 130. The armature 11 is configured such that forty-eight tooth portions 131 that extend radially inward are arranged at a uniform angular pitch on an inner circumferential surface of a core back that is configured by arranging the core back portions 130 into the annular shape. The first core segments 30A are disposed on mounting portions of the armature 10. In this case, first core segments 30A are disposed at three positions so as to be separated in a circumferential direction. The second core segments 30B are disposed on non-mounting portions of the armature 10. Spaces between circumferentially adjacent tooth portions 131 constitute the slots 13.

The armature winding 20 has a plurality of unit coils 21. The unit coils 21 are configured into a coil pattern in which a conductor wire 19 that has an oblong cross section, and that is made of jointless continuous copper wire or aluminum wire that is coated with electrical insulation, is inserted into a first slot, a second slot, and a third slot that line up at a spacing of six slots in a circumferential direction, so as to alternate an axial direction of insertion into the first slot, the second slot, and the third slot, sequentially in order of the second slot, the first slot, the second slot, the third slot, the second slot, and the first slot, and such that inserted positions in a radial direction inside the slots 13 are displaced radially outward sequentially one layer at a time. In other words, as shown in FIG. 6, the unit coils 21 are configured into a coil pattern that resembles a figure "8" turned on its side when viewed from radially inside. The unit coils 21 that are produced in this manner are distributed-winding lap windings. Moreover, a conductor wire that has a circular cross section may be used instead of the conductor wire 19 that has an oblong cross section. Furthermore, a spacing of six slots is a pitch between slot centers of slots 13 that are positioned on two sides of six circumferentially consecutive tooth portions 131, and in this case corresponds to a pitch of one magnetic pole.

As shown in FIGS. 5 through 7, the unit coils 21 include: first, second, third, fourth, fifth, and sixth slot-inserted portions S1 through S6 that form three columns so as to have a spacing of six slots; a first terminal T1 that extends outward from a first end of the first slot-inserted portion S1; a first turn portion T1-2 that links together second ends of the first and second slot-inserted portions S1 and S2; a second turn portion T2-3 that links together first ends of the second and third slot-inserted portions S2 and S3; a third turn portion T3-4 that links together second ends of the third and fourth slot-inserted portions S3 and S4; a fourth turn portion T4-5 that links together first ends of the fourth and fifth slot-inserted portions S4 and S5; a fifth turn portion T5-6 that links together second ends of the fifth and sixth slot-inserted portions S5 and S6; and a second terminal T6 that extends outward from a first end of the sixth slot-inserted portion S6.

The first and second slot-inserted portions S1 and S2 are radially displaced by an amount equal to a radial thickness of the conductor wire 19 by a crank portion that is formed at a circumferentially intermediate position on the first turn portion T1-2. The second and third slot-inserted portions S2 and S3 are radially displaced by an amount equal to the radial thickness of the conductor wire 19 by a crank portion that is formed at a circumferentially intermediate position on the second turn portion T2-3. The third and fourth slot-inserted portions S3 and S4 are radially displaced by an amount equal to the radial thickness of the conductor wire 19 by a crank portion that is formed at a circumferentially intermediate position on the third turn portion T3-4. The fourth and fifth slot-inserted portions S4 and S5 are radially displaced by an amount equal to the radial thickness of the conductor wire 19 by a crank portion that is formed at a circumferentially intermediate position on the fourth turn portion T4-5. The fifth and sixth slot-inserted portions S5 and S6 are radially displaced by an amount equal to the radial thickness of the conductor wire 19 by a crank portion that is formed at a circumferentially intermediate position on the fifth turn portion T5-6.

The first turn portion T1-2 extends from the second end of the first slot-inserted portion S1 to a radially inner end portion of the crank portion so as to maintain a radial position, and extends from a radially outer end portion of the crank portion to the second end of the second slot-inserted portion S2 so as to maintain a radial position. In other words, the first turn portion T1-2 is constituted by: a crank portion that constitutes an apex portion; and a pair of oblique portions that are positioned at two circumferential ends of the crank portion. The second turn portion T2-3, the third turn portion T3-4, the fourth turn portion T4-5, and the fifth turn portion T5-6 are configured in a similar or identical manner to that of the first turn portion T1-2.

As shown in FIG. 8, the first slot-inserted portion S1 of a unit coil 21 is inserted at a position of a first layer in the slot 13 at Number 7, the second slot-inserted portion S2 is inserted at a position of a second layer in the slot 13 at Number 1, the third slot-inserted portion S3 is inserted at a position of a third layer in the slot 13 at Number 7, the fourth slot-inserted portion S4 is inserted at a position of a fourth layer in the slot 13 at Number 13, the fifth slot-inserted portion S5 is inserted at a position of a fifth layer in the slot 13 at Number 7, and the sixth slot-inserted portion S6 is inserted at a position of a sixth layer in the slot 13 at Number 1.

The unit coils 21 that are mounted to the slots 13 are arranged in the armature core 11 in this manner at a pitch of one slot in a circumferential direction so as to be equal in number to the slots 13. First, second, third, fourth, fifth, and sixth slot-inserted portions S1 through S6 that are constituted by three unit coils 21 are thereby inserted into six layers so as to line up in a single column in a radial direction in each of the slots 13. Moreover, the first layer is the layer at a radially innermost position among the six layers of the first through sixth slot-inserted portions S1 through S6 that are inserted so as to line up in the single columns inside the slots 13, and the sixth layer is the layer at a radially outermost position.

To assemble the armature 10 that is configured in this manner, first forty-eight unit coils 21 are arranged in a circumferential direction at a pitch of one slot, as shown in FIG. 9, to produce an annular armature winding 20 in an unconnected state. In this armature winding 20 that is in an unconnected state, forty-eight groups of first, second, third, fourth, fifth, and sixth slot-inserted portions S1 through S6 that are lined up in a single column radially are arranged in the circumferential direction at a pitch of one slot.

Next, as shown in FIG. 10, forty-eight first core segments 30A and second core segments 30B are disposed so as to be arranged in an annular shape radially outside the armature winding 20. Here, the tooth portions 131 of the first core segments 30A and the second core segments 30B are each positioned radially outside so as to be between circumferentially adjacent groups of first, second, third, fourth, fifth, and sixth slot-inserted portions S1 through S6. Next, the forty-eight first core segments 30A and second core segments 30B are moved radially inward. The tooth portions 131 are thereby inserted between the circumferentially adjacent groups of first, second, third, fourth, fifth, and sixth slot-inserted portions S1 through S6. Then, the circumferential side surfaces between the core back portions 130 of the circumferentially adjacent first core segments 30A and second core segments 30B are butted together, to complete radially inward movement of the first core segments 30A and the second core segments 30B. As shown in FIG. 11, the armature winding 20 is thereby mounted to the armature core 11. Next, the armature 10 is assembled by joining the first terminals T1 and second terminals T6 of some of the unit coils 21 to the first terminals T1 and second terminals T6 of other unit coils 21 by welding, etc.

Figure 12:
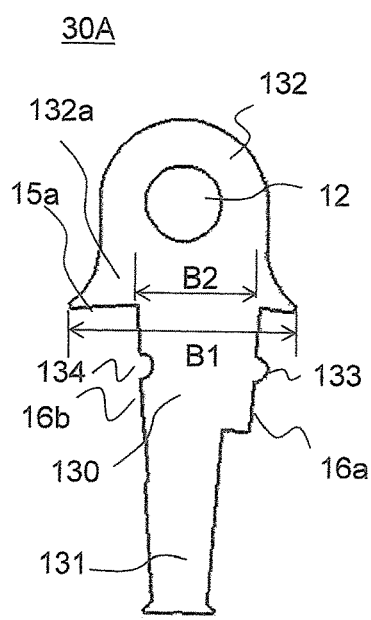
FIG. 12 is an end elevation that shows a first core segment that constitutes part of the armature core in the armature according to Embodiment 1 of the present invention.

Next, configuration of the first core segments 30A and the second core segments 30B will be explained with reference to FIGS. 12 through 16. FIG. 12 is an end elevation that shows a first core segment that constitutes part of the armature core in the armature according to Embodiment 1 of the present invention, FIG. 13 is an oblique projection that shows the first core segment that constitutes part of the armature core in the armature according to Embodiment 1 of the present invention, FIG. 14 is an end elevation that shows a second core segment that constitutes part of the armature core in the armature according to Embodiment 1 of the present invention, FIG. 15 is an oblique projection that shows the second core segment that constitutes part of the armature core in the armature according to Embodiment 1 of the present invention, and FIG. 16 is a partial end elevation that shows an assembled state of the armature core in the armature according to Embodiment 1 of the present invention.

Figure 13:
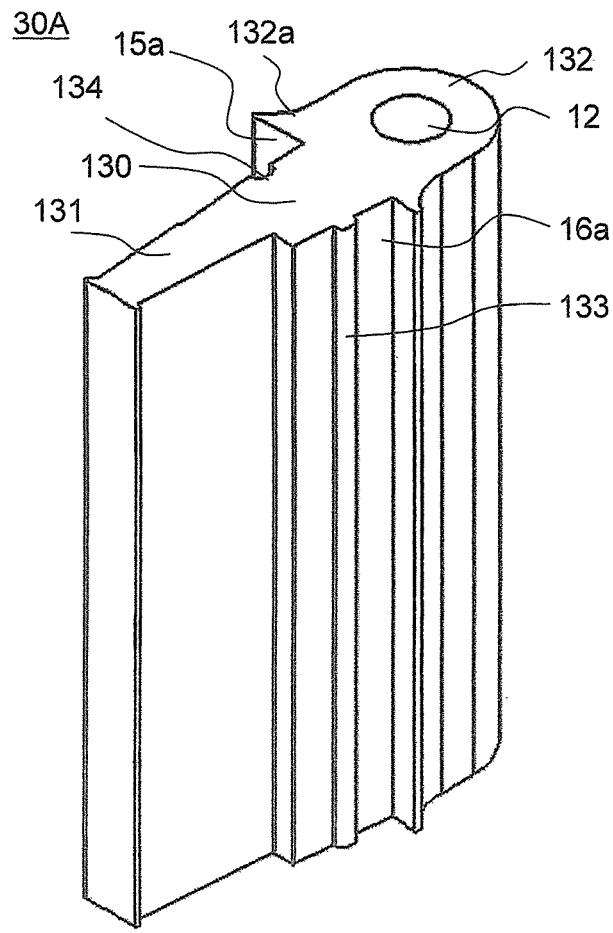
FIG. 13 is an oblique projection that shows the first core segment that constitutes part of the armature core in the armature according to Embodiment 1 of the present invention.

As shown in FIGS. 12 and 13, the first core segments 30A include: a circular arc-shaped core back portion 130; a tooth portion 131 that extends radially inward from an inner circumferential surface of the core back portion 130; and a mounting portion 132 that projects radially outward from the core back portion 130. A bolt passage aperture 12 that constitutes a penetrating aperture is formed so as to pass axially through the mounting portion 132. A positioning projection 133 that constitutes an interfitting protruding portion is formed at a radially central position on a side surface on a first side in a circumferential direction of the core back portion 130 so as to extend from a first axial end to a second axial end. A positioning groove 134 that constitutes an interfitting recess portion is formed at a radially central position on a side surface on a second side in the circumferential direction of the core back portion 130 so as to extend from the first axial end to the second axial end. The positioning projection 133 is formed so as to have a convex shape that has a semicircular cross section. The positioning groove 134 is formed so as to have a concave shape that has a semicircular cross section that can fit together with the positioning projection 133. A circumferential width B1 on a radially inner side of the mounting portion 132 is greater than a circumferential width B2 of the core back portion 130. Specifically, portions on a radially inner side of the mounting portion 132 project from the core back portion 130 on two circumferential sides. Inner circumferential surfaces of these projecting portions 132a constitute a first radial stopping surface 15a. The side surface of the core back portion 130 on the first side in the circumferential direction constitutes a first circumferential stopping surface 16a, and the side surface on the second side constitutes a first circumferential stopping surface 16b.

Figure 14:
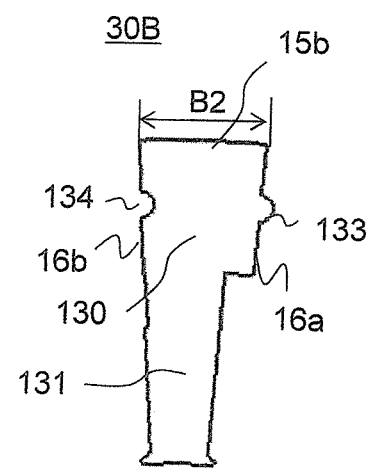
FIG. 14 is an end elevation that shows a second core segment that constitutes part of the armature core in the armature according to Embodiment 1 of the present invention.
Figure 15:
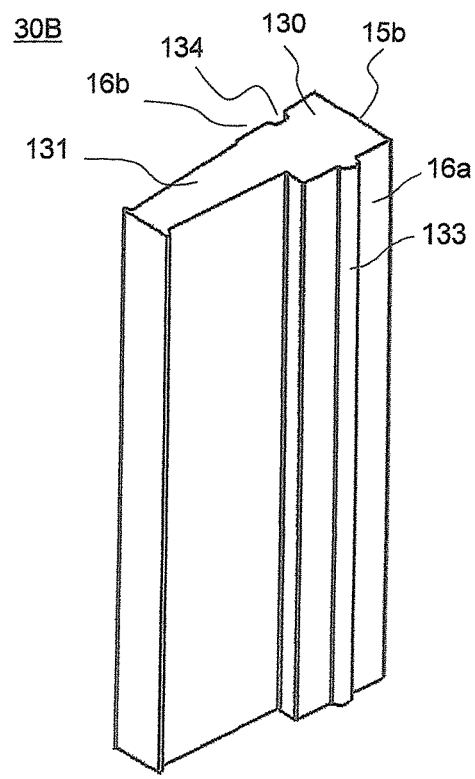
FIG. 15 is an oblique projection that shows the second core segment that constitutes part of the armature core in the armature according to Embodiment 1 of the present invention.
Figure 16:
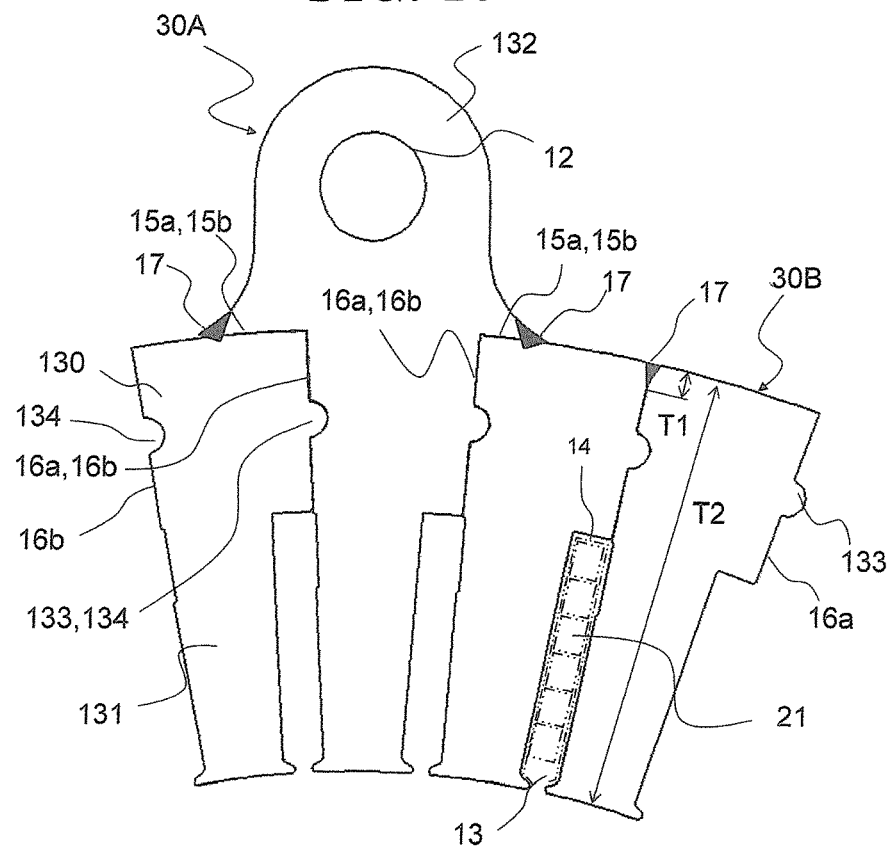
FIG. 16 is a partial end elevation that shows an assembled state of the armature core in the armature according to Embodiment 1 of the present invention.

As shown in FIGS. 14 and 15, the second core segments 30B are formed so as to have a similar or identical shape to that of the first core segments 30A except that a mounting portion 132 is not formed thereon. An outer circumferential surface of the core back portion 130 constitutes a first radial stopping surface 15b. The side surface on the first side in the circumferential direction of the core back portion 130 constitutes a first circumferential stopping surface 16a, and the side surface on the second side constitutes a first circumferential stopping surface 16b. Here, the first radial stopping surface 15a of the first core segments 30A and the first radial stopping surface 15b of the second core segments 30B have circular arc-shaped surfaces that have identical radii of curvature. Surfaces of the first circumferential stopping surfaces 16a and 16b of the first core segments 30A and the second core segments 30B except for the positioning projections 133 and the positioning grooves 134 are flat surfaces that each form a portion of a plane that includes an axial center of the armature core 11. The first core segments 30A and the second core segments 30B are laminated core segments in which core laminations that are punched from thin magnetic sheets such as electromagnetic steel sheets are laminated and integrated.

The first core segments 30A and the second core segments 30B are formed so as to have identical shapes except for the mounting portions 132. In other words, the core back portions 130 divide an annular core back of the armature core 11 into forty-eight equal segments.

As shown in FIG. 16, the forty-eight first core segments 30A and second core segments 30B are arranged into an annular shape such that the positioning projections 133 are fitted into the positioning grooves 134, and the first circumferential stopping surfaces 16a and 16b of the core back portion 130 are butted together. The projecting portions 132a of the first core segments 30A are disposed radially outside the core back portions 130 of the second core segments 30B in a state in which the first radial stopping surfaces 15a thereof contact the first radial stopping surfaces 15b of the second core segments 30B. The projecting portions 132a are joined to the core back portions 130 of the second core segments 30B by welding. The first core segments 30A and the second core segments 30B are thereby fixed by weld portions 17. The linked bodies of the welded first core segments 30A and second core segments 30B are in contact at two surfaces, i.e., the first radial stopping surfaces 15a and 15b and the first circumferential stopping surfaces 16a and 16b. Core back portions 130 of circumferentially adjacent second core segments 30B are also joined together by welding. The circumferentially adjacent second core segments 30B are thereby fixed to each other by weld portions 17. The linked bodies of welded second core segments 30B are in contact at single surfaces, i.e., the first circumferential stopping surfaces 16a and 16b.

According to Embodiment 1, mounting portions 132 are formed integrally on a radially outer side of core back portions 130 so as to project on two circumferential sides from the core back portions 130. Thus, in Embodiment 1, the mounting portions 132 can be made larger than when mounting portions 132 are formed so as not to project from the core back portions 130 in a circumferential direction. Thus, even if the aperture shape of the bolt passage apertures 12 is enlarged, area that is required for the seats of the mounting portions 132 can be ensured. Alternatively, even if the aperture shape of the bolt passage aperture 12 is reduced, a large seat area can be ensured on the mounting portions 132. As a result thereof, the armature 10 can be mounted to the bracket 3 firmly. The generation of vibration and noise in the rotary electric machine 100 is thereby suppressed, enabling quietness to be improved.

The first core segments 30A and the second core segments 30B are in contact not only at the first circumferential stopping surfaces 16a and 16b, but also at the first radial stopping surfaces 15a and 15b. Because of that, when the first core segments 30A and the second core segments 30B are fixed at the weld portions 17, the number of surfaces where the first core segments 30A and the second core segments 30B are in contact is increased, and the contacting area is also increased. As a result thereof, the rigidity of the linked bodies of the welded first core segments 30A and second core segments 30B can be increased. The generation of vibration and noise in the rotary electric machine 100 is thereby suppressed, enabling quietness to be improved.

Here, the circumferential width B1 of the mounting portions 132 is set so as to satisfy Expression (1).

$$B1 > \pi \cdot D/N \quad \text{Expression (1)}$$

Here, D is the diameter at the first radial stopping surfaces 15a and 15b, and N is the number of segments into which the armature core 11 is divided. In Embodiment 1, N=48.

If the circumferential width B1 of the mounting portions 132 is set so as to satisfy $B1 > \pi \cdot D/N$, it is not necessary to make the mounting portions 132 smaller even if the number of segments into which the armature core 11 is divided is increased. The holding strength of the armature core 11 can thereby be increased, even if the number of segments into which the armature core 11 is divided is increased, suppressing the generation of vibration and noise in the rotary electric machine 100.

Moreover, although not discussed in Embodiment 1 above, a filler such as a varnish may be filled between the first circumferential stopping surfaces 16a and 16b and inside the slots 13. If there are gaps between the first circumferential stopping surfaces 16a and 16b and inside the slots 13 when the core back portions 130 of the second core segments 30B are fixed to each other by welding, then the geometric moment of inertia I relative to radial bending in the linked bodies of the welded second core segments 30B is expressed by Expression (2).

$$I = L \times (T1)^3/12 \quad \text{Expression (2)}$$

Here, L is the axial length of the second core segments 30B, and T1 is a radial penetrating depth of the weld portions 17.

If, on the other hand, a filler is filled between the first circumferential stopping surfaces 16a and 16b and inside the slots 13 when the core back portions 130 of the second core segments 30B are fixed to each other by welding, then the geometric moment of inertia I relative to radial bending in the linked bodies of the welded second core segments 30B is expressed by Expression (3).

$$I = L \times (T2)^3/12 \quad \text{Expression (3)}$$

Here, T2 is the radial length of the second core segments 30B.

The radial penetrating depth T1 of the weld portions 17 is set to a minimum depth for reasons of efficiency, and empirically, T2 is from 10 times to twenty times T1. Because of that, the geometric moment of inertia I when filled with a filler is from 1,000 times to 8,000 times the geometric moment of inertia when not filled with a filler, allowing for a significant improvement in flexural rigidity. Flexural rigidity is expressed by E×I. Here, E is the Young's modulus of the material. If the filler is a resin material, the Young's modulus of the filler is approximately 1/100 of the Young's modulus of a core that is produced using a ferrous material. Thus, the flexural rigidity (=E×I) when filled with a filler that is made of a resin material is from ten times to eighty times the flexural rigidity when not filled with a filler, enabling the flexural rigidity to be improved significantly. Because the penetrating depth T1 of the weld portions 17 can be reduced as a result thereof, increases in core loss that occur due to welding can be suppressed, enabling increases in efficiency of the rotary electric machine 100 to be achieved.

It also becomes possible to alleviate management conditions relating to the penetrating depth T1 of the welding, enabling productivity to be improved.

Moreover, the filler need only fill either between the first circumferential stopping surfaces 16a and 16b or inside the slots 13. Furthermore, it may fill only some of the slots 13 among the forty-eight slots 13.

Furthermore, in Embodiment 1 above, a case in which a filler is filled between the first circumferential stopping surfaces 16a and 16b and inside the slots 13 has been explained, but similar or identical effects can also be achieved if a filler is filled between circumferential stopping surfaces and inside slots in other embodiments.

Embodiment 2

Figure 17:
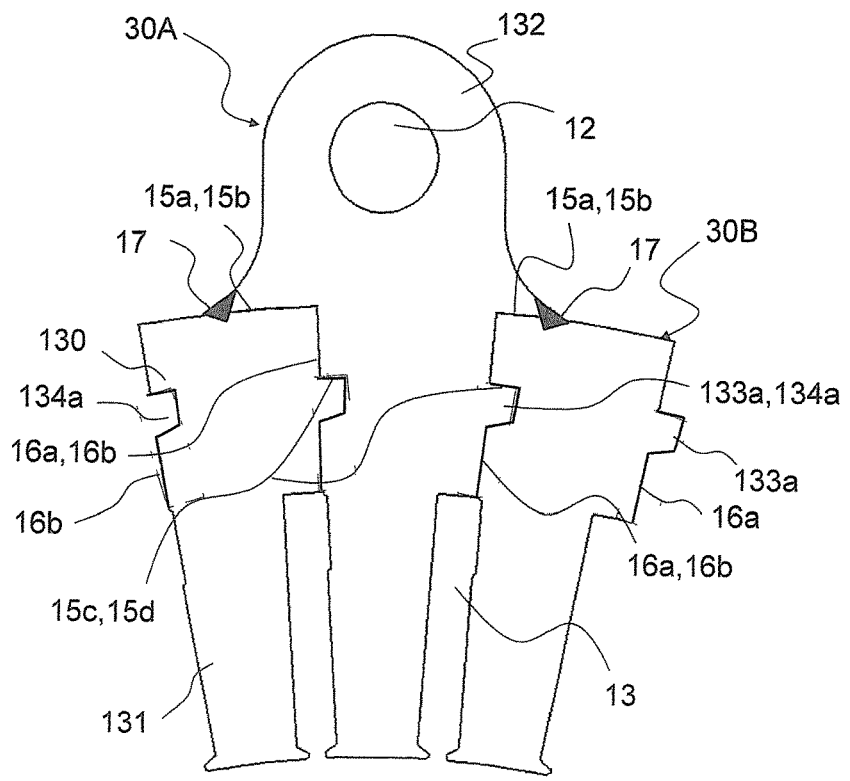
FIG. 17 is a partial end elevation that shows an assembled state of an armature core in an armature according to Embodiment 2 of the present invention.

FIG. 17 is a partial end elevation that shows an assembled state of an armature core in an armature according to Embodiment 2 of the present invention.

In FIG. 17, positioning projections 133a that constitute interfitting protruding portions are formed on radially central portions of first core segments 30A and second core segments 30B on side surfaces on a first side in a circumferential direction of core back portions 130 so as to extend from a first axial end to a second axial end. Positioning grooves 134a that constitute interfitting recess portions are formed on radially central portions of the first core segments 30A and second core segments 30B on side surfaces on a second side in a circumferential direction of the core back portions 130 so as to extend from a first axial end to a second axial end. The positioning projections 133a are formed so as to have a convex shape that has a quadrangular cross section. A surface of the positioning projections 133a that faces radially outward is formed into an inclined surface that displaces radially inward circumferentially away from a first circumferential stopping surface 16a. A surface of the positioning projections 133a that faces radially inward is formed into an inclined surface that displaces radially outward circumferentially away from the first circumferential stopping surface 16a. An angle of inclination of the surface of the positioning projections 133a that faces radially outward relative to a plane that is perpendicular to the first circumferential stopping surface 16a and that is parallel to an axial center of the armature core 11 is less than an angle of inclination of the surface of the positioning projections 133a that faces radially inward relative to the plane that is perpendicular to the first circumferential stopping surface 16a and that is parallel to the axial center of the armature core 11. The positioning grooves 134a are formed so as to have a concave shape that has a quadrangular cross section that can fit together with the positioning projections 133a. Here, a surface of the positioning projections 133a that faces radially outward constitutes a second radial stopping surface 15c. A surface of the positioning grooves 133a that faces radially outward constitutes a second radial stopping surface 15d.

Moreover, a remainder of the configuration is configured in a similar or identical manner to that of Embodiment 1 above.

In Embodiment 2, mounting portions 132 are formed integrally on a radially outer side of core back portions 130 so as to project on two circumferential sides from the core back portions 130. Thus, in Embodiment 2, an armature 10 can also be mounted firmly to a bracket 3, in a similar or identical manner to Embodiment 1 above, and the generation of vibration and noise in the rotary electric machine is thereby suppressed, enabling quietness to be improved.

According to Embodiment 2, the welded first core segments 30A and second core segments 30B are in contact at three surfaces, i.e., the first radial stopping surfaces 15a and 15b, the second radial stopping surfaces 15c and 15d, and the first circumferential stopping surfaces 16a and 16b. Thus, the number of surfaces contacting in the linked bodies between the welded first core segments 30A and second core segments 30B is increased, and the contacting area is also increased. As a result thereof, the rigidity of the linked bodies of the welded first core segments 30A and second core segments 30B can be increased. The generation of vibration and noise in the rotary electric machine is thereby suppressed, enabling quietness to be improved.

The welded adjacent second core segments 30B are in contact at two surfaces, i.e., the second radial stopping surfaces 15c and 15d and the first circumferential stopping surfaces 16a and 16b. Thus, the number of surfaces contacting in the linked bodies between the adjacent second core segments 30B is increased, and the contacting area is also increased. As a result thereof, the rigidity of the linked bodies of the welded adjacent second core segments 30B can be increased. The generation of vibration and noise in the rotary electric machine is thereby suppressed, enabling quietness to be improved.

Embodiment 3

Figure 18:
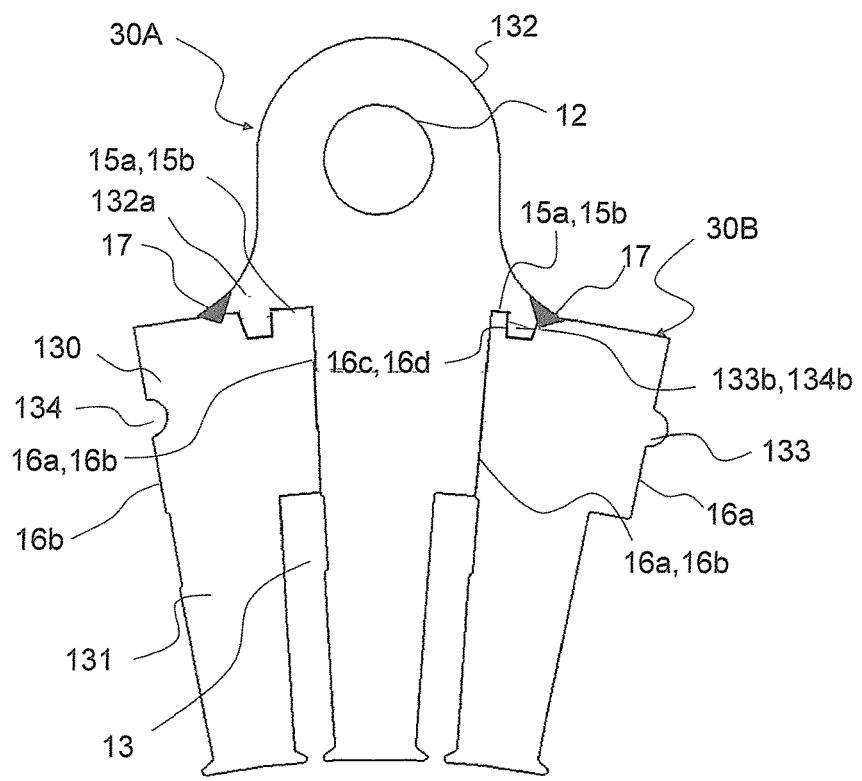
FIG. 18 is a partial end elevation that shows an assembled state of an armature core in an armature according to Embodiment 3 of the present invention.

FIG. 18 is a partial end elevation that shows an assembled state of an armature core in an armature according to Embodiment 3 of the present invention.

In FIG. 18, positioning projections 133b that constitute interfitting protruding portions are formed so as to protrude radially inward from respective protruding portions 132a of a first core segment 30A. Positioning grooves 134b that constitute interfitting recess portions are formed on outer circumferential surfaces of core back portions 130 of second core segments 30B that are positioned on two sides of the first core segment 30A. The positioning projections 133b are formed so as to have a convex shape that has a quadrangular cross section. An angle of inclination of a surface of the positioning projections 133b that faces toward the core back portion 130 of the first core segment 30A relative to a plane that includes an axial center of the armature core 11 that intersects the surface in question is smaller than an angle of inclination of a surface of the positioning projections 133b that faces away from the core back portion 130 of the first core segment 30A relative to a plane that includes the axial center of the armature core 11 that intersects the surface in question. The positioning grooves 134b are formed so as to have a concave shape that has a quadrangular cross section that can fit together with the positioning projections 133b. Here, the surfaces of the positioning projections 133a that face toward the core back portion 130 constitutes a second circumferential stopping surface 16c. The surfaces of the positioning grooves 134b that are on a side near the first core segment 30A constitute a second circumferential stopping surface 16d.

Positioning projections 133 and positioning grooves 134 are omitted from the core back portion 130 of the first core segment 30A. A surface of the core back portion 130 that faces a first side in a circumferential direction constitutes a first circumferential stopping surface 16a, and a surface of the core back portion 130 that faces a second side in the circumferential direction constitutes a first circumferential stopping surface 16b.

A positioning groove 134 is omitted from the core back portion 130 of the second core segment 30B that is positioned on a first circumferential side of the first core segment 30A. A surface of the core back portion 130 that faces the first side in a circumferential direction constitutes a first circumferential stopping surface 16a, and a surface of the core back portion 130 that faces a second side in the circumferential direction constitutes a first circumferential stopping surface 16b.

A positioning projection 133 is omitted from the core back portion 130 of the second core segment 30B that is positioned on a second circumferential side of the first core segment 30A. A surface of the core back portion 130 that faces the first side in a circumferential direction constitutes a first circumferential stopping surface 16a, and a surface of the core back portion 130 that faces a second side in the circumferential direction constitutes a first circumferential stopping surface 16b.

Moreover, a remainder of the configuration is configured in a similar or identical manner to that of Embodiment 1 above.

In Embodiment 3, mounting portions 132 are formed integrally on a radially outer side of core back portions 130 so as to project on two circumferential sides from the core back portions 130. Thus, in Embodiment 3, an armature 10 can also be mounted firmly to a bracket 3, in a similar or identical manner to Embodiment 1 above, and the generation of vibration and noise in the rotary electric machine is thereby suppressed, enabling quietness to be improved.

According to Embodiment 3, the welded first core segments 30A and second core segments 30B are in contact at three surfaces, i.e., the first radial stopping surfaces 15a and 15b, the first circumferential stopping surfaces 16a and 16b, and the second first circumferential stopping surfaces 16c and 16d. Thus, the number of surfaces contacting in the linked bodies between the welded first core segments 30A and second core segments 30B is increased, and the contacting area is also increased. As a result thereof, the rigidity of the linked bodies of the welded first core segments 30A and second core segments 30B can be increased. The generation of vibration and noise in the rotary electric machine is thereby suppressed, enabling quietness to be improved.

Moreover, in Embodiment 3 above, circumferentially adjacent second core segments 30B are positioned relative to each other by fitting the positioning projections 133 and the positioning grooves 134 together, but circumferentially adjacent second core segments 30B may be positioned relative to each other by fitting positioning projections 133 and positioning grooves 134 together.

Embodiment 4

Figure 19:
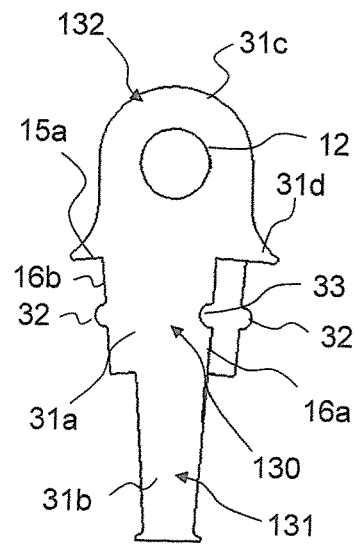
FIG. 19 is an end elevation that shows a first core segment that constitutes part of an armature core in an armature according to Embodiment 4 of the present invention.
Figure 20:
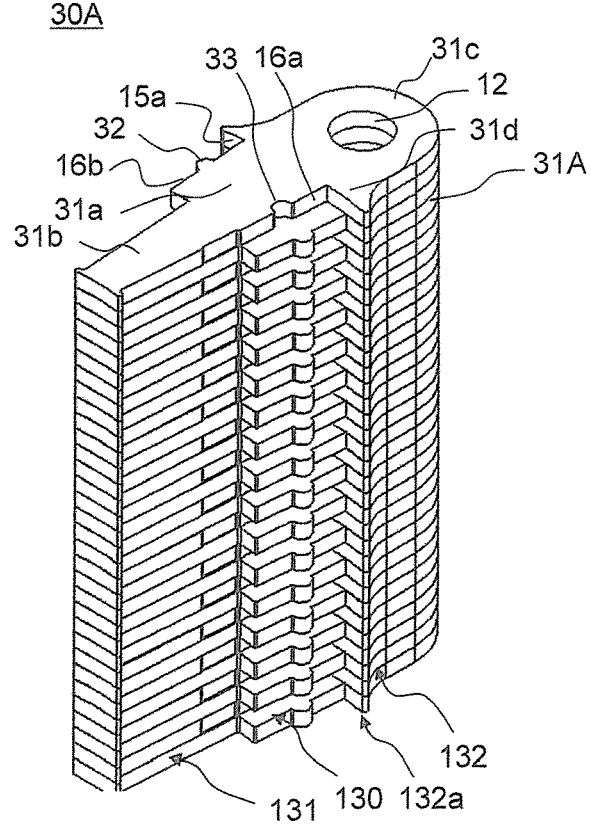
FIG. 20 is an oblique projection that shows the first core segment that constitutes part of the armature core in the armature according to Embodiment 4 of the present invention.
Figure 21:
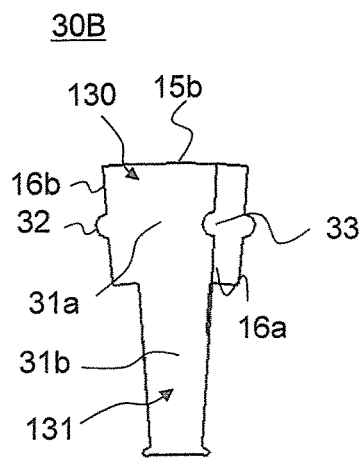
FIG. 21 is an end elevation that shows a second core segment that constitutes part of the armature core in the armature according to Embodiment 4 of the present invention.
Figure 22:
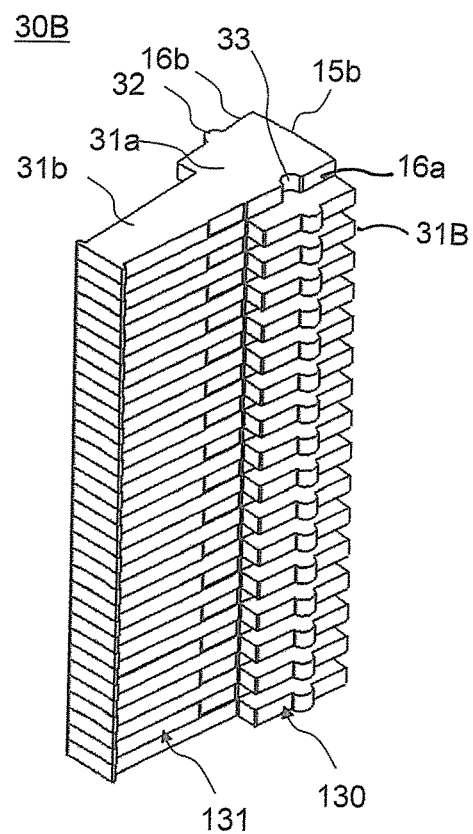
FIG. 22 is an oblique projection that shows the second core segment that constitutes part of the armature core in the armature according to Embodiment 4 of the present invention.
Figure 23:
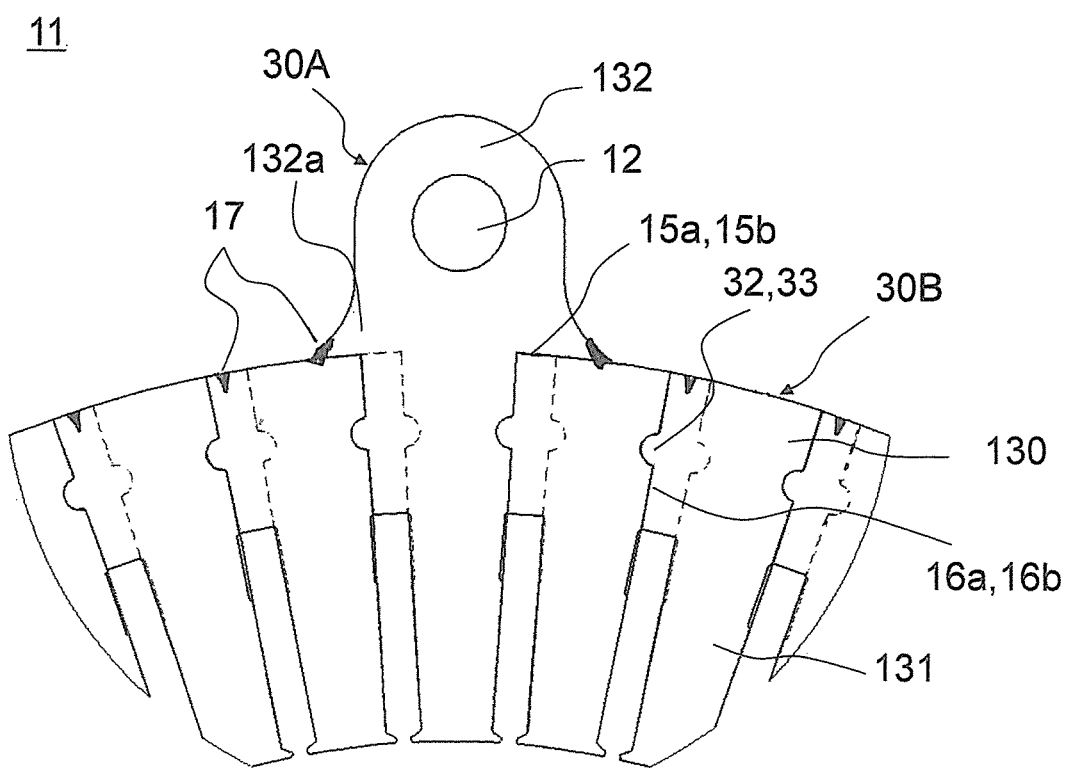
FIG. 23 is a partial end elevation that shows an assembled state of the armature core in the armature according to Embodiment 4 of the present invention.

FIG. 19 is an end elevation that shows a first core segment that constitutes part of an armature core in an armature according to Embodiment 4 of the present invention, FIG. 20 is an oblique projection that shows the first core segment that constitutes part of the armature core in the armature according to Embodiment 4 of the present invention, FIG. 21 is an end elevation that shows a second core segment that constitutes part of the armature core in the armature according to Embodiment 4 of the present invention, FIG. 22 is an oblique projection that shows the second core segment that constitutes part of the armature core in the armature according to Embodiment 4 of the present invention, and FIG. 23 is a partial end elevation that shows an assembled state of the armature core in the armature according to Embodiment 4 of the present invention.

In FIGS. 19 and 20, a first core segment 30A is formed so as to have a symmetrical outline, i.e., external shape, that has as an axis of symmetry a straight line that passes through a circumferential center of a tooth portion 131 when viewed from axially outside. The first core segment 30A is produced by laminating core laminations 31A that are punched from thin magnetic sheets such as electromagnetic steel sheets so as to reverse a front and a back thereof alternately. The core laminations 31A include: a core back portion 31a; a tooth portion 31b; a mounting portion 31c; and projecting portions 31d that project circumferentially outward from the mounting portion 31c near the core back portion 31a. The core laminations 31A are formed so as to have a symmetrical outline, i.e., external shape, that has as an axis of symmetry a straight line that passes through a circumferential center of a tooth portion 131 when viewed from axially outside, which is a sheet thickness direction thereof, except for the core back portion 31a. Specifically, the core back portions 31a are formed so as to have linearly asymmetrical outlines, i.e., external shapes, relative to the straight line that passes through the circumferential center of the tooth portion 31b. Here, the core back portions 31a are displaced to a first circumferential side relative to the straight line that passes through the circumferential center of the tooth portion 31b. Positioning projections 32 are formed on radially central portions of first circumferential side surfaces of the core back portions 31a. Positioning grooves 33 are formed on radially central portions of second circumferential side surfaces of the core back portions 31a. The positioning projections 32 have a convex shape that has a semicircular cross section. The positioning grooves 33 have a concave shape that has a semicircular cross section that can fit together with the positioning projections 32.

Here, the core back portions 31a of the core laminations 31A are laminated to constitute a core back portion 130 of the first core segment 30A. The tooth portions 31b of the core laminations 31A are laminated to constitute the tooth portion 131 of the first core segment 30A. The mounting portions 31c of the core laminations 31A are laminated to constitute the mounting portion 132 of the first core segment 30A. Inner circumferential surfaces of the projecting portions 31d of the mounting portions 31c of the core laminations 31A constitute first radial stopping surfaces 15a. Two circumferential side surfaces of the core back portions 31a of the core laminations 31A constitute first circumferential stopping surfaces 16a and 16b.

In FIGS. 21 and 22, a second core segment 30B is produced by laminating core laminations 31B that are punched from thin magnetic sheets such as electromagnetic steel sheets so as to reverse a front and a back thereof alternately. The core laminations 31B are formed so as to have a similar shape to the core laminations 31A except that the mounting portion 31c is omitted.

Here, the core back portions 31a of the core laminations 31B are laminated to constitute a core back portion 130 of the second core segment 30B. The tooth portions 31b of the core laminations 31B are laminated to constitute the tooth portion 131 of the second core segment 30B. Outer circumferential surfaces of the core back portions 31a of the core laminations 31B constitute first radial stopping surfaces 15b. Two circumferential side surfaces of the core back portions 31a of the core laminations 31B constitute first circumferential stopping surfaces 16a and 16b.

As shown in FIG. 23, the armature 11 is configured by arranging forty-eight first core segments 30A and second core segments 30B into an annular shape such that core back portions 31a of one core segment are inserted between core back portions 31a of another core segment. The positioning projections 32 are thereby fitted together with the positioning grooves 33, and the first circumferential stopping surfaces 16a and 16b of the core back portions 130 are butted together. The projecting portions 132a of the first core segments 30A are disposed radially outside the core back portions 130 of the second core segments 30B in a state in which the first radial stopping surfaces 15a thereof contact the first radial stopping surfaces 15b of the second core segments 30B. The projecting portions 132a are joined to the core back portions 130 of the second core segments 30B by welding. The first core segments 30A and the second core segments 30B are thereby fixed by weld portions 17. The linked bodies of the welded first core segments 30A and second core segments 30B are in contact at three surfaces, i.e., the first radial stopping surfaces 15a and 15b, the first circumferential stopping surfaces 16a and 16b, and surfaces of the core back portions 31a that overlap in the axial direction that face an axial direction. Core back portions 130 of circumferentially adjacent second core segments 30B are also joined together by welding. The circumferentially adjacent second core segments 30B are thereby fixed to each other by weld portions 17. The linked bodies of welded second core segments 30B are in contact at two surfaces, i.e., the first circumferential stopping surfaces 16a and 16b and surfaces of the core back portions 31a that overlap in the axial direction that face an axial direction.

In Embodiment 4, a mounting portion 132 is formed integrally on a radially outer side of a core back portion 130 so as to project from the core back portion 130 on two circumferential sides. Consequently, similar or identical effects to those in Embodiment 1 above can also be achieved in Embodiment 4.

According to Embodiment 4, a first core segment 30A is produced by laminating core laminations 31A so as to reverse a front and a back thereof alternately. A second core segment 30B is produced by laminating core laminations 31B so as to reverse a front and a back thereof alternately. Biases in sheet thicknesses of the thin magnetic sheets from which the core laminations 31A and 31B are punched are thereby canceled out, enabling shape accuracy of the armature core 11 to be improved.

In linked bodies of welded first core segments 30A and second core segments 30B, in addition to two surfaces between the first radial stopping surfaces 15a and 15b and the first circumferential stopping surfaces 16a and 16b, surfaces of the core back portions 31a that face an axial direction that overlap in the axial direction are in contact. The linked bodies of welded first core segments 30A and second core segments 30B are thereby in contacted at three surfaces, in a radial direction, a circumferential direction, and an axial direction. Thus, the number of surfaces contacting in the linked bodies between the welded first core segments 30A and second core segments 30B is increased, and the contacting area is also increased. As a result thereof, the rigidity of the linked bodies of the welded first core segments 30A and second core segments 30B can be increased. The generation of vibration and noise in the rotary electric machine is thereby suppressed, enabling quietness to be improved.

The linked bodies of the welded adjacent second core segments 30B are in contact at surfaces of the core back portions 31a that overlap in the axial direction that face an axial direction, in addition to single surfaces at the first circumferential stopping surfaces 16a and 16b. The linked bodies of welded adjacent second core segments 30B are thereby in contacted at two surfaces, in a circumferential direction and an axial direction. Thus, the number of surfaces contacting in the linked bodies between the adjacent second core segments 30B is increased, and the contacting area is also increased. As a result thereof, the rigidity of the linked bodies of the welded adjacent second core segments 30B can be increased. The generation of vibration and noise in the rotary electric machine is thereby suppressed, enabling quietness to be improved.

In the linking portions between the welded first core segments 30A and second core segments 30B, the core back portions 31a of the first core segments 30A and the core back portions 31a of the second core segments 30B overlap axially. In the linking portions between the welded adjacent second core segments 30B, the core back portions 31a of one second core segment 30B and the core back portions 31a of another second core segments 30B overlap axially. Magnetic flux thereby flows more easily in a circumferential direction through the core back of the armature core, improving output from the rotary electric machine.

Moreover, in Embodiment 4 above, the core laminations 31A and 31B are laminated so as to reverse a front and a back thereof alternately, but it is not necessary to reverse the front and back of the core laminations 31A and 31B one sheet at a time, and a plurality of sheets may be reversed each time.

In Embodiment 4 above, the positioning projections 32 and the positioning grooves 33 are formed so as to have semicircular cross sections, but positioning projections and positioning grooves may be formed so as to have similar or identical quadrangular cross sections to those of Embodiment 2.

Embodiment 5

Figure 24:
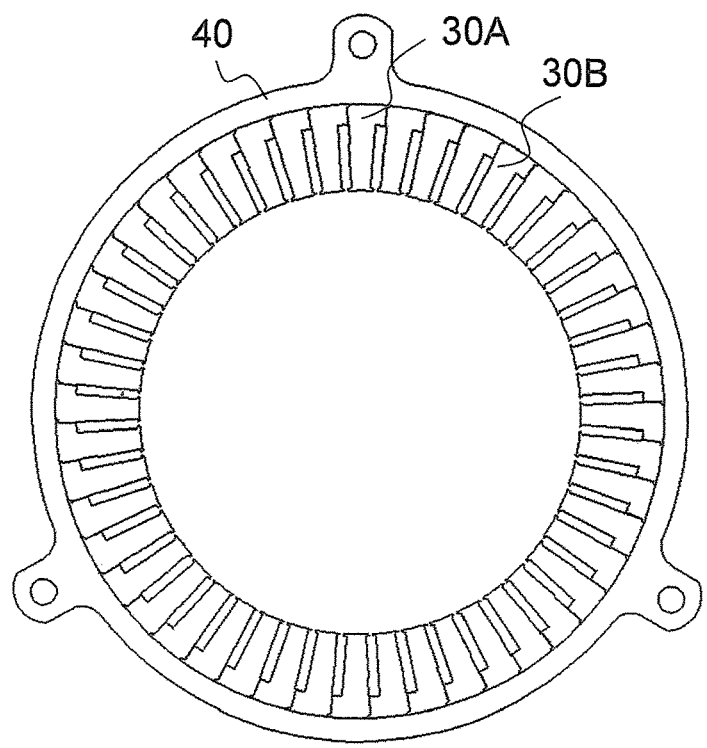
FIG. 24 is an end elevation that shows an armature core in an armature according to Embodiment 5 of the present invention.
Figure 25:
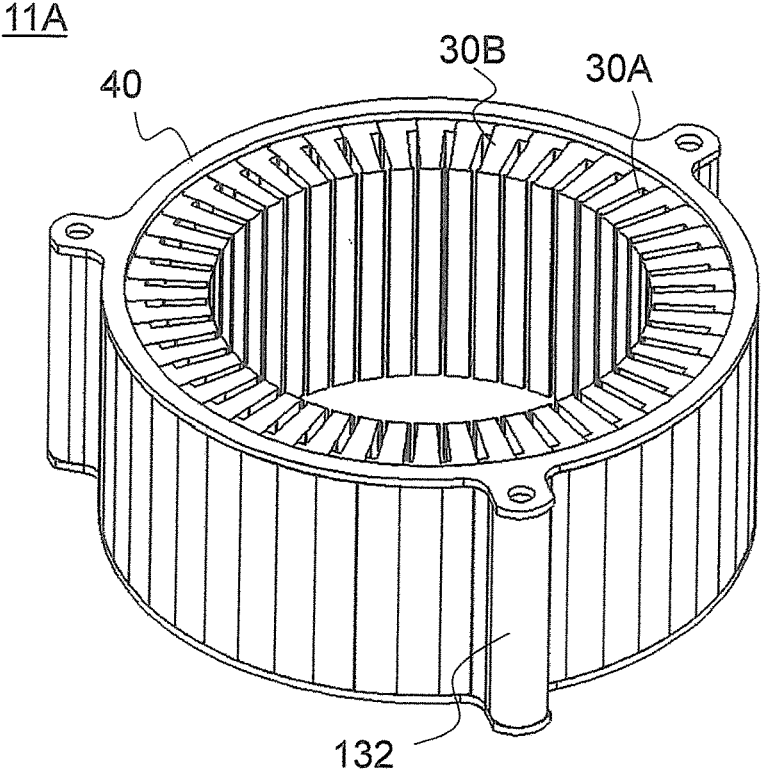
FIG. 25 is an oblique projection that shows the armature core in the armature according to Embodiment 5 of the present invention.

FIG. 24 is an end elevation that shows an armature core in an armature according to Embodiment 5 of the present invention, and FIG. 25 is an oblique projection that shows the armature core in the armature according to Embodiment 5 of the present invention.

In FIGS. 24 and 25, flat ring-shaped metal end plates 40 are disposed on two axial ends of a core that is configured by arranging first core segments 30A and second core segments 30B into an annular shape. Moreover, the core to which the end plates 40 are mounted is a core according to any one of Embodiments 1 through 4.

End plates 40 are disposed on two axial ends of the armature core 11A that is configured in this manner. Holding strength is thereby increased when the armature core 11A is fastened onto a bracket 3, and rigidity of the armature core 11A is also increased. As a result thereof, the generation of vibration and noise is suppressed, improving quietness of the rotary electric machine.

Now, in Embodiment 5 above, end plates 40 are disposed on two axial ends of the first core segments 30A and second core segments 30B that are arranged in an annular shape, but an end plate 40 may be disposed at one axial end of the first core segments 30A and second core segments 30B that are arranged in an annular shape.

Moreover, in each of the above embodiments, unit coils are used that are formed into a coil pattern that resembles a "figure of 8" turned on its side when viewed from radially inside, but U-shaped coil segments, hexagonal coils in which a conductor wire is wound helically into an approximate hexagonal shape, wave-shaped coils in which a conductor wire is formed so as to have a wave shape, etc., can be used as the unit coils.

In each of the above embodiments, an eight-pole forty-eight-slot three-phase armature has been explained, but the number of poles, the number of slots, and the number of phases in the armature are not limited thereto.

In each of the above embodiments, an armature core is divided equally into forty-eight first and second core segments, but it is not necessary to configure the armature core so as to be divided equally provided that first core segments are configured such that mounting portions project on two circumferential side from the core back portions.

In each of the above embodiments, the first and second core segments have a single tooth portion, but they may have a plurality of tooth portions.

What is claimed is:
1. An armature comprising:
an annular armature core; and
an armature winding that is mounted to said armature core, wherein:
said armature core is configured by arranging into an annular shape:
at least one first core segment that comprises:
a circular arc-shaped first core back portion;
a first tooth portion that extends radially inward from an inner circumferential surface of said first core back portion;

a mounting portion that is formed on an outer circumferential portion of said first core back portion; and
a penetrating aperture that passes axially through said mounting portion; and
a plurality of second core segments that comprise:
a circular arc-shaped second core back portion; and
a second tooth portion that extends radially inward from an inner circumferential surface of said second core back portion;
said mounting portion comprises projecting portions that project on two circumferential sides from said first core back portion; and
said first core segments and said second core segments that are adjacent to each other are fixed in a state in which facing side surfaces between said first core back portions and said second core back portions contact each other, and inner circumferential surfaces of said projecting portions and outer circumferential surfaces of said second core back portions are in contact.

2. The armature according to claim 1, wherein:
an interfitting protruding portion is formed on a first side surface of facing side surfaces of said first core back portions and said second core back portions, and an interfitting recess portion that fits together with said interfitting protruding portion is formed on a second side surface of said facing side surfaces of said first core back portions and said second core back portions; and
surfaces of said interfitting protruding portion and said interfitting recess portion that face each other in a radial direction are in contact.

3. The armature according to claim 2, wherein said first core back portions and said second core back portions that are adjacent to each other overlap axially.

4. The armature according to claim 2, wherein said first core back portions and said second core back portions that are adjacent to each other are welded.

5. The armature according to claim 2, wherein an annular end plate is disposed on an axial end portion of said first core segments and said second core segments that are arranged in an annular shape.

6. The armature according to claim 2, wherein a filler is inserted into at least a portion between said first tooth portions and said second tooth portions that are adjacent to each other, between said first core back portions and said second core back portions that are adjacent to each other, and between said second core back portions that are adjacent to each other.

7. The armature according to claim 2, wherein a circumferential width B1 of said mounting portion is configured so as to satisfy:

$$B1 > \pi \times D/N$$

where D is a diameter of said second core back portion, N is a total number of said first core segments and said second core segments, and circumferential widths of said first core back portion and said second core back portions are equal.

8. The armature according to claim 1, wherein:
an interfitting protruding portion is formed on an inner circumferential surface of said projecting portions, and an interfitting recess portion that fits together with said interfitting protruding portion is formed on an outer circumferential surface of said second core back portions; and
surfaces of said interfitting protruding portion and said interfitting recess portion that face each other in a circumferential direction are in contact.

9. The armature according to claim 8, wherein said first core back portions and said second core back portions that are adjacent to each other overlap axially.

10. The armature according to claim 8, wherein said first core back portions and said second core back portions that are adjacent to each other are welded.

11. The armature according to claim 8, wherein an annular end plate is disposed on an axial end portion of said first core segments and said second core segments that are arranged in an annular shape.

12. The armature according to claim 8, wherein a filler is inserted into at least a portion between said first tooth portions and said second tooth portions that are adjacent to each other, between said first core back portions and said second core back portions that are adjacent to each other, and between said second core back portions that are adjacent to each other.

13. The armature according to claim 8, wherein a circumferential width B1 of said mounting portion is configured so as to satisfy:

$$B1 > \pi \times D/N$$

where D is a diameter of said second core back portion, N is a total number of said first core segments and said second core segments, and circumferential widths of said first core back portion and said second core back portions are equal.

14. The armature according to claim 1, wherein said first core back portions and said second core back portions that are adjacent to each other overlap axially.

15. The armature according to claim 1, wherein said first core back portions and said second core back portions that are adjacent to each other are welded.

16. The armature according to claim 1, wherein an annular end plate is disposed on an axial end portion of said first core segments and said second core segments that are arranged in an annular shape.

17. The armature according to claim 1, wherein a filler is inserted into at least a portion between said first tooth portions and said second tooth portions that are adjacent to each other, between said first core back portions and said second core back portions that are adjacent to each other, and between said second core back portions that are adjacent to each other.

18. The armature according to claim 1, wherein a circumferential width B1 of said mounting portion is configured so as to satisfy:

$$B1 > \pi \times D/N$$

where D is a diameter of said second core back portion, N is a total number of said first core segments and said second core segments, and circumferential widths of said first core back portion and said second core back portions are equal.

* * * * *